US012583771B2

(12) United States Patent
Wood

(10) Patent No.: US 12,583,771 B2
(45) Date of Patent: Mar. 24, 2026

(54) TURBOELECTRIC COAGULATION APPARATUS INCLUDING CASSETTE-STYLE ANODE ASSEMBLY

(71) Applicant: Avivid Water Technology, LLC, Longmont, CO (US)

(72) Inventor: Lockett E. Wood, Lyons, CO (US)

(73) Assignee: Avivid Water Technology, LLC, Longmont, CO (US)

( * ) Notice: Subject to any disclaimer, the term of this patent is extended or adjusted under 35 U.S.C. 154(b) by 303 days.

(21) Appl. No.: 17/370,862

(22) Filed: Jul. 8, 2021

(65) Prior Publication Data

US 2022/0009799 A1 Jan. 13, 2022

Related U.S. Application Data

(60) Provisional application No. 63/049,515, filed on Jul. 8, 2020.

(51) Int. Cl.
*C02F 1/463* (2023.01)
*C02F 1/461* (2023.01)

(52) U.S. Cl.
CPC .......... *C02F 1/463* (2013.01); *C02F 1/46109* (2013.01); *C02F 2001/46123* (2013.01); *C02F 2001/46171* (2013.01); *C02F 2209/05* (2013.01)

(58) Field of Classification Search
CPC ......... C02F 1/463; F16D 1/0864; B01F 27/00
See application file for complete search history.

(56) References Cited

U.S. PATENT DOCUMENTS

| 951,311 A * | 3/1910 | Hartman ................. C02F 1/463 |
| 2,585,060 A * | 2/1952 | Wallace ............. G01N 27/4045 |
| | | 204/402 |

(Continued)

FOREIGN PATENT DOCUMENTS

| CN | 1068799 A | 2/1993 |
| CN | 101597098 A | 12/2009 |

(Continued)

OTHER PUBLICATIONS

International Searching Authority, International Search Report and Written Opinion, mailed in relationship to International Application No. PCT/US2014/049944, mailed Dec. 10, 2014 (9 pages).

(Continued)

*Primary Examiner* — Luan V Van
*Assistant Examiner* — Andrew Koltonow
(74) *Attorney, Agent, or Firm* — Polsinelli PC; Gregory P. Durbin

(57) ABSTRACT

An apparatus for removing contaminants from fluid is disclosed. The apparatus includes a rotating electrode assembly including an inner shaft rotatably mounted within the housing and a first rotatable planar electrode extending radially outward from the inner shaft. The apparatus also includes a first planar stationary electrode having a first opening, the first opening shaped to permit the inner shaft to pass through the first opening, the first planar stationary electrode extending parallel to the first rotatable planar electrode, wherein the first planar stationary electrode and the first rotatable planar electrode are configured to be coupled to an external source. In addition, the apparatus includes a motor assembly including a motor and a first outer shaft coupled to the inner shaft. The rotating electrode assembly is configured to be removed from the housing when the inner shaft is decoupled from the first outer shaft.

15 Claims, 10 Drawing Sheets

(56) References Cited

U.S. PATENT DOCUMENTS

| | | | | |
|---|---|---|---|---|
| 2,624,728 | A * | 1/1953 | Dubpernell | C25D 17/22 |
| | | | | 204/201 |
| 3,342,718 | A * | 9/1967 | Adams | C25C 1/20 |
| | | | | 430/455 |
| 4,571,091 | A * | 2/1986 | Pardo | B01F 27/82 |
| | | | | 366/311 |
| 5,004,537 | A | 4/1991 | Brown | |
| 6,099,703 | A | 8/2000 | Syversen et al. | |
| 6,448,528 | B1 | 9/2002 | Yoshida | |
| 9,145,313 | B2 | 9/2015 | Wood et al. | |
| 2004/0007539 | A1 | 1/2004 | Denes et al. | |
| 2004/0020861 | A1 | 2/2004 | Lehmann et al. | |
| 2005/0247571 | A1 | 11/2005 | Grigg | |
| 2007/0175767 | A1 | 8/2007 | Suzuki | |
| 2008/0180031 | A1 | 7/2008 | Pokryvailo | |
| 2009/0101490 | A1 | 4/2009 | Thiers | |
| 2009/0107915 | A1 | 4/2009 | Skinner et al. | |
| 2011/0000790 | A1 * | 1/2011 | Wood | C02F 1/463 |
| | | | | 204/649 |
| 2011/0297552 | A1 | 12/2011 | Boyle et al. | |
| 2012/0181233 | A1 * | 7/2012 | Artoni | C02F 1/727 |
| | | | | 210/194 |
| 2017/0165680 | A1 * | 6/2017 | Johnson | C02F 1/001 |

FOREIGN PATENT DOCUMENTS

| | | | |
|---|---|---|---|
| DE | 2657319 | A1 | 6/1978 |
| NL | 1014806 | C2 | 2/2001 |

OTHER PUBLICATIONS

State Intellectual Property Office of the People's Republic of China, Search Report, mailed in relationship to CN201080031649.X, dated Feb. 24, 2014 (2 pages).

European Patent Office, Extended European Search Report, mailed in relationship to EP10794788.9, dated Jan. 24, 2013 (5 pages).

* cited by examiner

TURBOELECTRIC COAGULATION APPARATUS INCLUDING CASSETTE-STYLE ANODE ASSEMBLY

CROSS-REFERENCE TO RELATED APPLICATIONS

This application is related to and claims priority under 35 U.S.C. § 119(e) from U.S. Patent Application No. 63/049,515 filed Jul. 8, 2020, titled "Turboelectric Coagulation Apparatus Including Cassette Style Anode Assembly," the entire contents of which are incorporated herein by reference for all purposes. This application also incorporates by reference in its entirety U.S. Pat. No. 9,145,313 issued on Sep. 29, 2015.

TECHNICAL FIELD

The present disclosure relates generally to water purification and, more particularly, to purification of water using electrocoagulation.

BACKGROUND

Rivers, canals, estuaries, and other water bodies which are used as sources of water in developing countries have become polluted by indiscriminate discharge of industrial and animal waste products and by natural processes such as geochemical processes. Such indiscriminate discharge has introduced dangerous elements including arsenic into the groundwater. Wastewater generated by increasing population, industry, and other sources has polluted water sources in developed countries as well.

Coagulation is an important process for water treatment. Ions from heavy metals, as an example, and colloids generally remain in solution as a result of their electric charge. By neutralizing the ions, i.e., adding ions having opposite charges to the colloids, the ions and colloids can be destabilized and coagulation can be achieved by chemical or electrical methods. In the case of chemical coagulation, a coagulant, such as Alum $[Al_2(SO_4)_3 \cdot 18H_2O]$ or ferric chloride, as examples, may be employed. Chemical coagulation, however, tends to generate large volumes of sludge with significant bound water content.

In electrocoagulation, reactive ions may be generated in situ by oxidation of an effective anode material or reactive metallic hydroxides may be generated within the effluent. Such process offers an alternative to the addition of salts, polymers, or polyelectrolytes. Metals, colloidal solids, and suspended particles and oil droplets may be removed from wastewater by agglomeration or coagulation and resultant separation from the aqueous phase. An electrocoagulated floc tends to contain less water, and is more readily filterable.

Basically, an electrocoagulation reactor may include one or more pairs of parallel conductive metal plates, used as sacrificial electrodes, which may be of the same or of different materials. When connected to an external source of electrical power, the anode material may electrochemically corrode, while the cathode may be subject to passivation. Metals such as aluminum and iron can be used to generate ions in the water, which, as stated above, remove the contaminants by chemical reaction and precipitation, or by causing colloidal materials to coalesce making these species less soluble. Electrodes in electrocoagulation reactors may experience scaling or other metal coating processes over time diminishing their effectiveness as electrodes, and necessitating the use of readily removable and resurfaceable structures.

SUMMARY

In a first exemplary embodiment of the present invention, an apparatus for removing contaminants from fluid is disclosed. The apparatus may include a housing, a rotating electrode assembly including an inner shaft rotatably mounted within the housing and a first rotatable planar electrode extending radially outward from the inner shaft. The apparatus may include a first planar stationary electrode having a first opening, the first opening shaped to permit the inner shaft to pass through the first opening, the first planar stationary electrode extending parallel to the first rotatable planar electrode. The first planar stationary electrode and the first rotatable planar electrode may be configured to be coupled to an external source. The apparatus may also include a motor assembly including a motor and a first outer shaft coupled to the inner shaft. The motor may be configured to rotate the inner shaft such that, when fluid is contained within the housing and the motor rotates the inner shaft, the fluid is caused to pass through a first volume between the inner shaft and the first planar stationary electrode and to flow radially outward between the first planar stationary electrode and the first rotatable electrode. The rotating electrode assembly may be configured to be removed from the housing when the inner shaft is decoupled from the first outer shaft.

In some versions of the first embodiment, the apparatus may further include a sand trap in fluid communication with an internal volume of the housing, a second planar stationary electrode offset from the first planar stationary electrode, wherein the first rotatable planar electrode is disposed between the first planar stationary electrode and the second stationary planar electrode, a second rotatable planar electrode extending radially outward from the inner shaft and offset from the first rotatable planar electrode. The first planar stationary electrode may be disposed between the first rotatable planar electrode and the second rotatable planar electrode. The inner shaft of the rotating electrode assembly may include a first split-shaft coupler. The inner shaft of the rotating electrode assembly may include a first split-shaft coupler. The split-shaft coupler way form a portion of the electrical pathway. The inner shaft of the rotating electrode assembly may include a first split-shaft coupler at a first end of the inner shaft and a second split-shaft coupler at a second end of the inner shaft opposite the first end of the inner shaft, and wherein each of the first split-shaft coupler and the second split-shaft coupler forms a portion of the electrical pathway.

In a second exemplary embodiment of the present invention, a rotating electrode assembly may include a shaft having an electrically conductive inner core, a first shaft coupler positioned at an axial end of the shaft. The first shaft coupler may be configured to be removably mechanically and electrically coupled to a drive shaft coupler of a drive shaft within a housing of an electrocoagulation apparatus and the first shaft coupler may be mechanically coupled to the drive shaft coupler, the shaft is axially aligned with the drive shaft. The rotating electrode assembly may also include a rotatable planar electrode extending radially outward from the shaft and in electrical communication with the inner core. The rotatable planar electrode may be configured to cause electrocoagulation of contaminants in fluid between a stationary electrode in the housing and the rotatable planar electrode when the first shaft coupler is mechanically and electrically coupled to a second shaft coupler and when current is passed through the rotatable planar electrode.

In some versions of the second exemplary embodiment, the rotating electrode assembly may include a second rotatable planar electrode extending radially outward from the shaft and in electrical communication with the inner core. The inner core may be surrounded by a non-conductive outer core adjacent the rotatable planar electrode. The shaft may include a second shaft coupler at an axial end of the opposite the first shaft coupler. The second shaft coupler may be configured to be removably mechanically and electrically coupled to a bearing shaft coupler of a bearing shaft within the housing. The first shaft coupler may be a split-shaft coupler.

In a third exemplary embodiment of the present invention, an apparatus for removing contaminants from fluids may include a housing defining an inner volume, a rotating electrode assembly rotatably mounted entirely within the inner volume, the rotating electrode assembly including a shaft supporting a first rotatable planar electrode extending radially outward from the shaft, a stationary electrode mounted within the housing and extending parallel to the first rotatable planar electrode, and a motor bearing. A first axial end of the shaft may be mechanically and electrically coupled to the motor bearing within the inner volume such that the shaft is coaxial with the motor bearing.

In some versions of the third exemplary embodiment, the rotating electrode assembly may include a first split-shaft coupler coupled to the shaft and the motor bearing may include a second split-shaft coupler coupled to the first split-shaft coupler. The apparatus may include a free end bearing disposed opposite the motor bearing. A second axial end of the shaft opposite the first axial end may be mechanically and electrically coupled to the free end bearing within the inner volume such that the shaft is also coaxial with the free end bearing. The apparatus may include a motor coupled to the motor bearing. When the motor is actuated, the rotating electrode assembly may rotate within the housing. The apparatus may also include a sand trap in communication with the inner volume. The rotating electrode assembly may include a second rotatable planar electrode extending radially outward from the shaft and offset from the first rotatable planar electrode. The first planar stationary electrode may be disposed between the first rotatable planar electrode and the second rotatable planar electrode. The shaft may include an electrically conductive inner core and a non-conductive outer core.

DESCRIPTION OF THE DRAWINGS

The accompanying drawings, which are incorporated in and form a part of this disclosure, illustrate the embodiments of the present disclosure and, together with the description, serve to explain the principles of the various embodiments. In the drawings.

DESCRIPTION

Briefly, the present disclosure describes an apparatus and method for removing contaminant species from a fluid, such as water, by electrocoagulation. The fluid is circulated (or recirculated) in a reaction tank or reactor by at least one flat rigid disk having a suitable diameter and fixed or coupled to a motor driven shaft such that the disk may rotate as the shaft is rotated, and at least one flat, rigid stationary plate axially spaced apart and parallel to the disk, which together function as a fluid pump. The contaminated fluid enters through at least one axial opening in the stationary plate in the vicinity of and surrounding the shaft where liquid adhesion and viscosity direct the fluid radially outward toward the periphery of the disk/plate assembly as the disk is rotated, thereby imparting energy to the fluid as the it departs the outer periphery of the rotating disk. The fluid may then recirculate back to the opening near the shaft where it again enters the volume between the stationary plate and the rotating disk such that it can be again accelerated by the rotating disk back to its periphery. Additional flat rigid disks may be fixed or coupled to the motor driven shaft such that they rotate together as the shaft is rotated, and additional stationary plates disposed in an alternating, plate/disk/plate arrangement, as an example, may be added.

An electric field may be applied between each pair of rotating and stationary disk/plate arrangements causing current to flow therebetween and effectively forming electrode pairs, thereby coagulating the contaminants in the fluid flowing therebetween. The pumping action may continuously recirculate and re-expose the fluid to the electric field between the electrodes and, hence, the electrocoagulation process.

Figure 1:
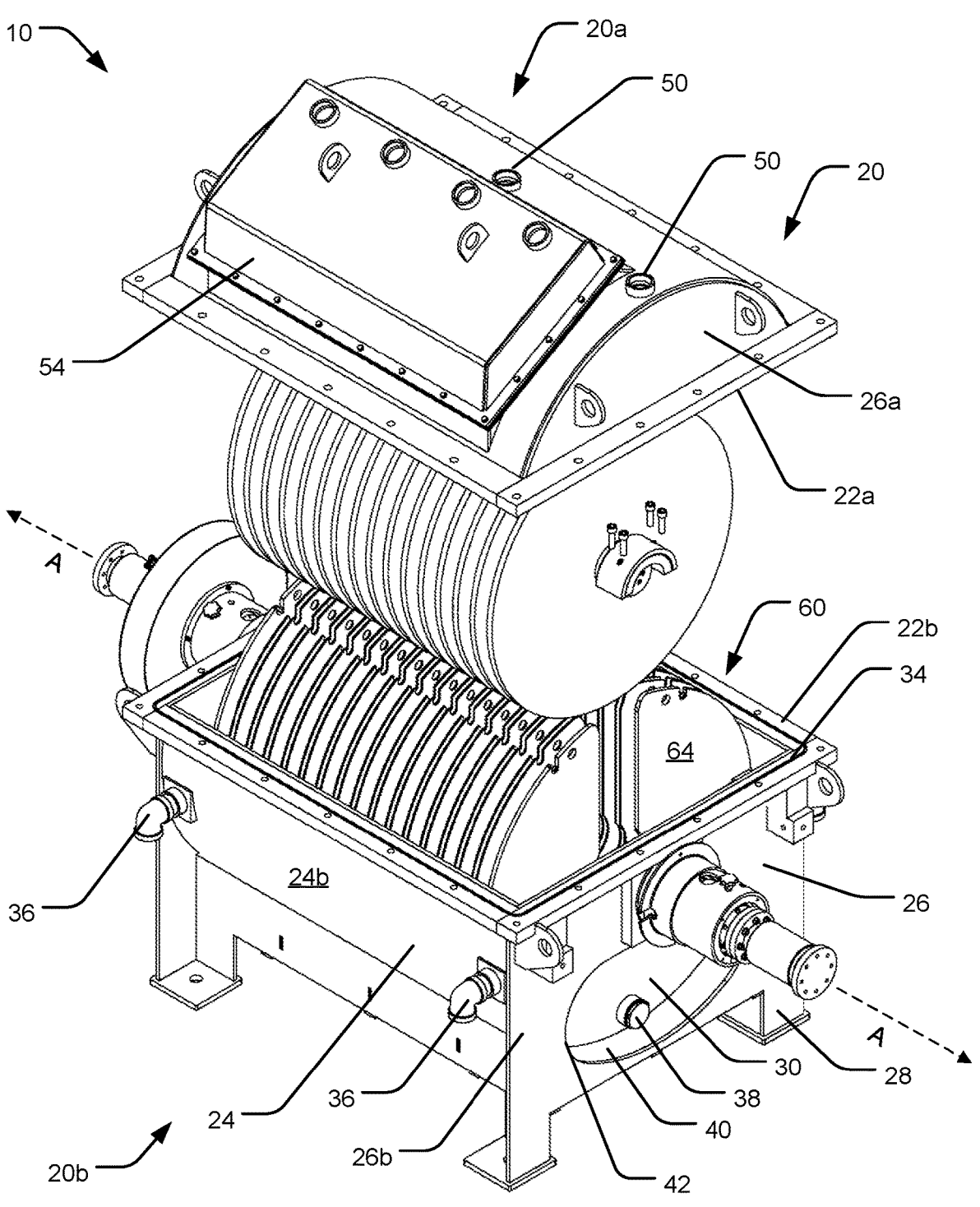
FIG. 1 is a partially exploded top, front, right-side isometric view of a turboelectric coagulation apparatus in accordance with the present disclosure.

Reference will now be made in detail to the present embodiments of the invention, examples of which are illustrated in the accompanying drawings. In the figures, similar structure will be identified using identical reference characters. FIG. 1 illustrates a representative embodiment of a turbocoagulation apparatus 10 for removing contaminants from a fluid, such as water. The turbocoagulation apparatus 10 generally includes a reactor housing 20 having a cylindrical outer wall 24 extending along a longitudinal axis A and multi-surface end caps 26 together defining a volume for containing a volume of fluid and internal components of the turbocoagulation apparatus 10. The reactor housing 20 may include an upper housing 20*a* and a lower housing 20*b* having respective upper and lower cylindrical outer walls 24a and 24b and upper and lower end caps 26a and 26b. The upper and lower housings 20a and 20b are configured to be sealed together along upper and lower peripheral abutment surfaces 22a and 22b of mutually sized openings of the upper and lower housings, 20a and 20b, respectively. At least one of the peripheral surfaces 22a and 22b may include a groove to hold an O-ring 34 for forming a watertight or airtight seal therebetween. In other embodiments, a gasket may be positioned between the peripheral abutment surfaces 22a and 22b. The upper and lower housings, 20a and 20b may be removably fastened together via any known method of providing non-permanent attachment, such as threaded fasteners. In other embodiments not shown, the upper and lower housings, 20a and 20b may be coupled together by a hinge extending along a common side-surface to form a clam-shell type of closure structure. In other embodiments not shown, the reactor housing 20 may include a single housing with a hinged or sliding access door.

Figure 2:
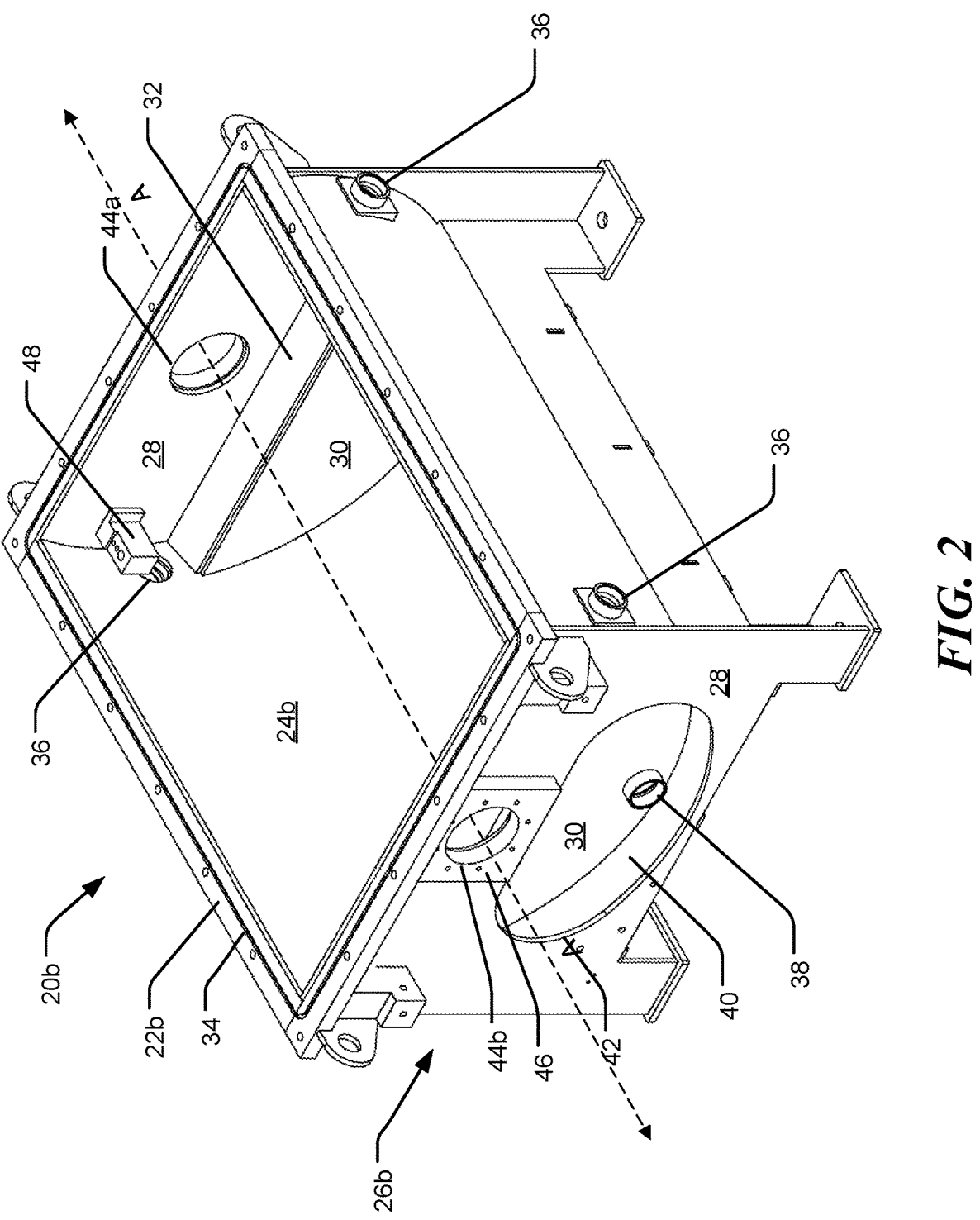
FIG. 2 is a top, front, left-side isometric view of a lower housing of the turboelectric coagulation apparatus from FIG. 1.

As shown in an isolated view of the lower housing 20b in FIG. 2, the lower end cap 26b includes an outer planar wall 28 axially offset from an inner planar wall 30, both of which being substantially perpendicular to the lower cylindrical outer wall 24b. The outer planar wall 28 is connected to the inner planar wall 30 by a planar shelf 32 which may form a slight angle with respect to the longitudinal axis A, but in other embodiments may be parallel with the longitudinal axis A.

Figure 3:
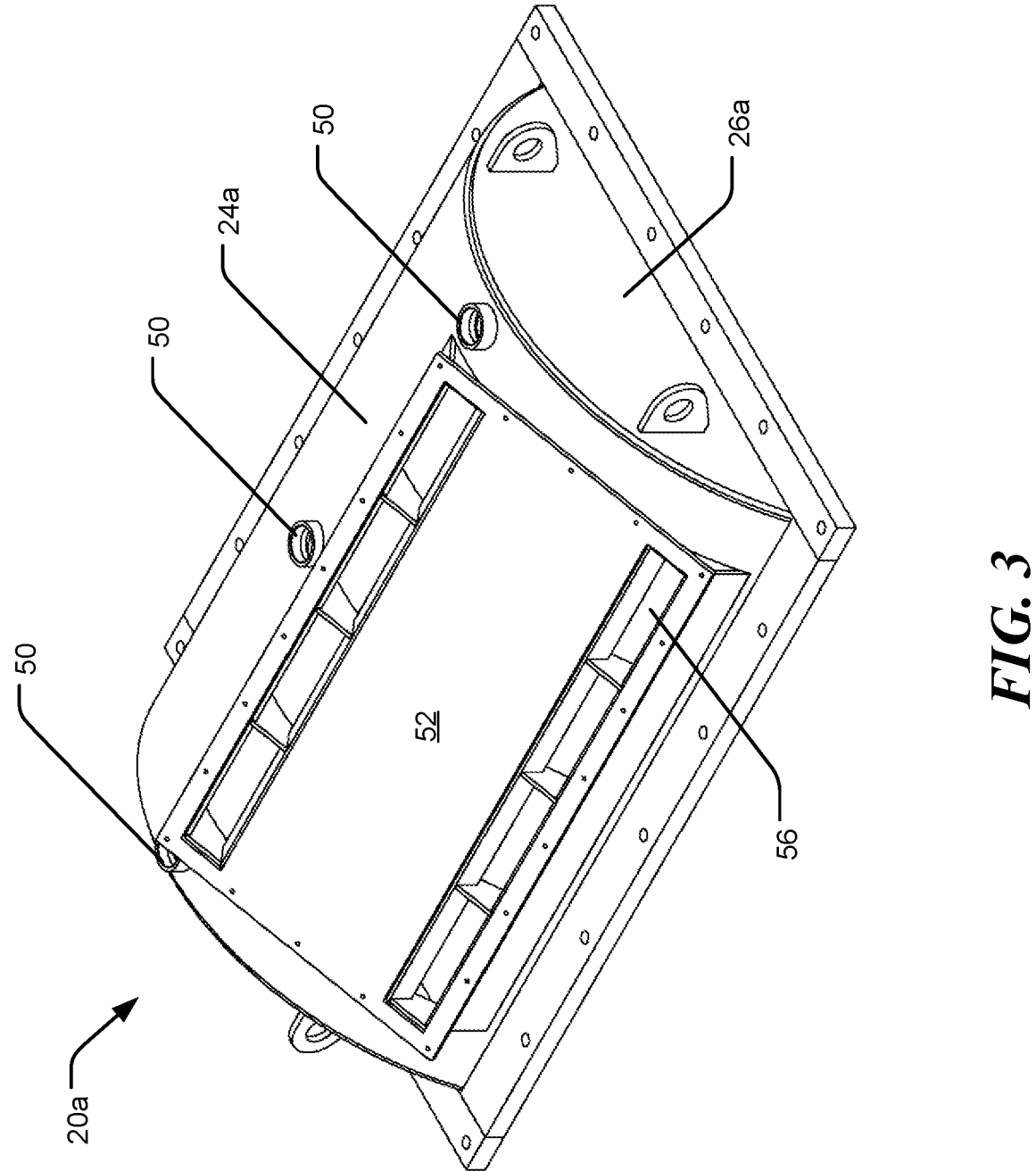
FIG. 3 is a top, front, right-side isometric view of an upper housing of the turboelectric coagulation apparatus from FIG. 1.

The lower housing 20b may include fluid openings 36, each of which may open radially through the lower cylindrical outer wall 24b at a position above where the planar shelf 32 intersects the lower cylindrical outer wall 24b. In the embodiment shown in the figures, the lower housing 20b includes four fluid openings 36 (two are shown in FIG. 2 and three are shown in FIG. 3), but in other embodiments, there may be more than or less than four fluid openings. In addition, the lower housing 20b may also include two fluid opening 38, each of them opening axially through the inner planar wall 30 near the boundary between the inner planar wall 30 and the lower cylindrical outer wall 24b beneath the longitudinal axis A. In other words, the fluid openings 38 are located near the bottom of the lower housing 20b at opposite ends. As with the fluid openings 36, other embodiments may include more than or less than the number of fluid openings 38 depicted in the figures, such as 1 or 3 or more. Any of the fluid openings 36 and 38 may be configured to be inlets for introducing fluid into the reactor housing 20, outlets for removing fluid from the reactor housing 20, or plugged or sealed. The lower housing 20b also includes a pair of mounting brackets 48 extending inwardly from each of the outer planar walls 28 at a position above the fluid openings 36. The mounting brackets 48 are configured to removably attach a stationary electrode assembly 60 in a substantially suspended state within the reactor housing 20. The stationary electrode assembly 60 is discussed in more detail below.

As shown in FIGS. 1 and 2, the outer planar wall 28 extends downward beyond the planar shelf 32 and outwardly beyond the lower cylindrical outer wall 24b, thus having a portion thereof that is not a boundary to the volume inside the reactor housing 20. The outer planar wall 28 is also connected to the inner planar wall 30 by a curvate shelf 40 that intersects the planar shelf 32. The curvate shelf 40 may have a cylindrical profile coincident with a portion of the lower cylindrical outer wall 24b. The outer planar wall 28 may include an opening 42 beneath the planar shelf 32 providing access to a lower surface of the planar shelf 32 and an upper surface of the curvate shelf 40. The opening 42 may accommodate a motor assembly 112 (see FIG. 10). The outer planar wall 28 defines a circular shaft opening 44a coaxial with the longitudinal axis A. An attachment block 46 is positioned against the outwardly facing surface of the outer planar wall 28 and also defines a circular shaft opening 44b coaxial with the longitudinal axis A and substantially the same diameter of the circular shaft opening 44a. The circular shaft openings 44a and 44b allow portions of a bearing assembly to extend into the lower housing 20b in a fluid tight manner, as is discussed below in more detail.

As shown in FIG. 3, the upper housing 20a includes three access ports 50 axially spread apart along an upper most portion of the upper cylindrical outer wall 24a. The access ports 50 may provide a conduit to make electrical connection with components within the reactor housing 20 and/or to introduce liquid or solid additives to the fluid within the reactor housing 20. In other embodiments, the upper housing 20a may include more than or less than three access ports 50. In addition, the upper housing 20a includes a sand trap attachment portion 52 for removably attaching a sand trap 54 (see FIG. 1) for filtering and trapping coagulated sludge and abrasive additives form the fluid. The sand trap attachment portion 52 includes a plurality of ducts 56 providing a fluidic pathway to the sand trap 54.

Figure 4:
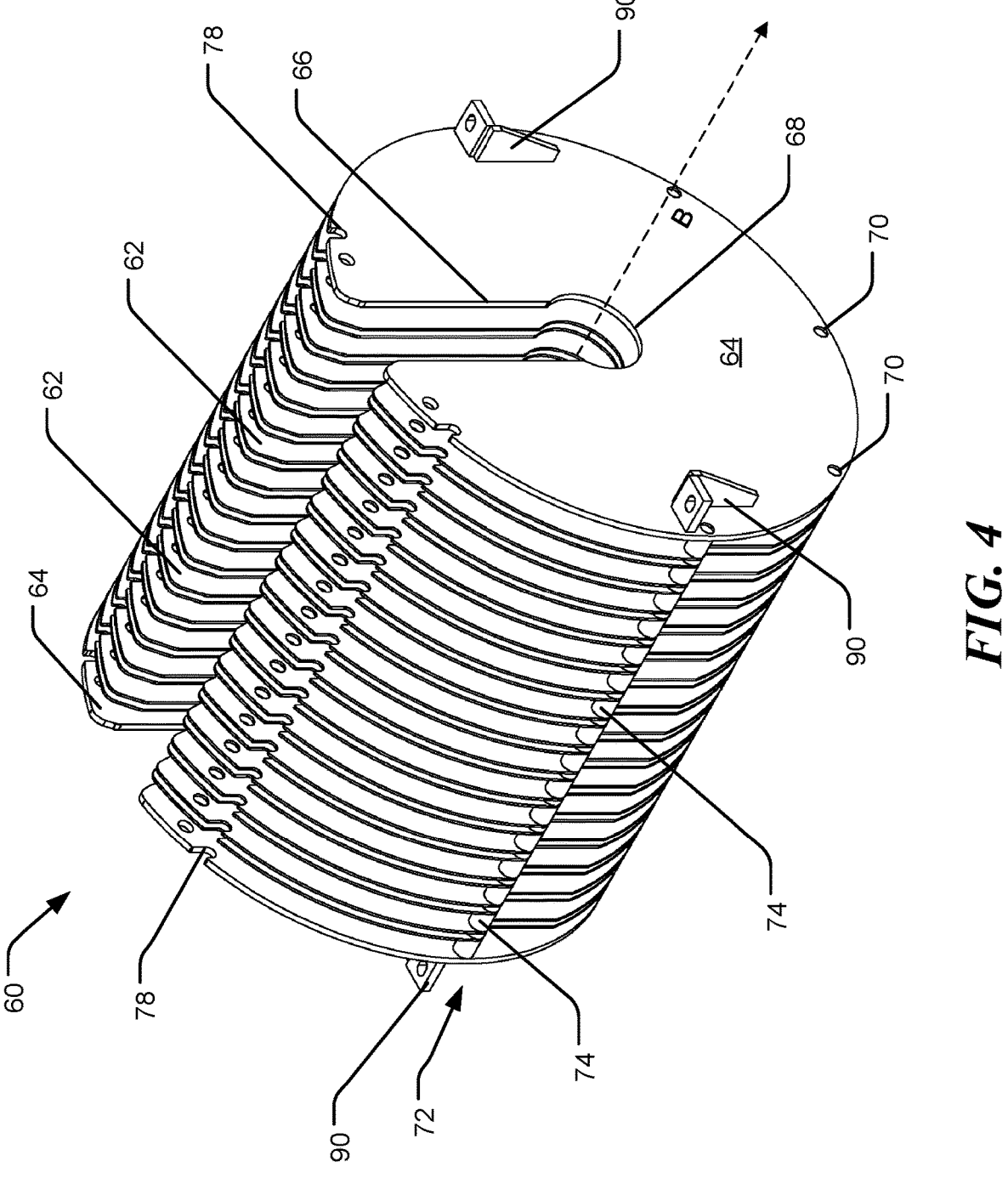
FIG. 4 is a top, front, right-side isometric view of a stationary electrode assembly of the turboelectric coagulation apparatus from FIG. 1.

As shown in an isolated view of the stationary electrode assembly 60 in FIG. 4, the stationary electrode assembly 60 includes an array of inner electrode plates 62 having a substantially circular disk shape and aligned with a longitudinal axis B. In the embodiment shown in the figures, thirty (30) inner electrode plates 62 are depicted; however, in other embodiments, the stationary electrode assembly 60 may include more or less than thirty (30) inner electrode plates 62. The inner electrode plates 62 may have alternating axial spacing of a narrow distance $X_1$ followed by a wider distance $X_2$ (see FIG. 5). The first and the last inner electrode plates 62 in the electrode assembly 60 are also axially spaced apart the distance $X_2$ from outer electrodes plates 64. The outer electrode plates 64 may have the same or similar size and profile as the inner electrode plates 62. As shown, the outer electrode plates 64 may have a larger axial thickness than the inner electrode plates 62. However, in other embodiments not shown, the outer electrode plates 64 have the same thickness as the inner electrode plates 62. Each of the inner and outer electrode plates 62 and 64 may have a radial slot 66 extending from an outer peripheral edge of the plate to the center, the radial slot 66 having a width large enough to allow passage of a drive shaft 96 from a cassette-style electrode assembly 92 (see FIG. 6) during installation or removal thereof. The radial slot 66 may be aligned in a vertical direction with the radial slot 66 opening from an upper portion of the inner and outer electrode plates 62 and 64 when the stationary electrode assembly 60 is installed within the lower housing 20b. The radial slot 66 may terminate at a circular opening 68 at the center of the inner and outer electrode plates 62 and 64, the circular opening 68 may have a larger diameter than the width of the radial slot 66 to permit the fluid to flow close to the longitudinal axis A surrounding the drive shaft 96.

Each of the inner and outer electrode plates 62 and 64 may include a plurality bore holes 70 circumferentially spaced apart near the periphery of the plate. At least some of the bore holes 70 may be located near or below a virtual midpoint line that effectively divides the inner and outer electrode plates 62 and 64 into upper and lower halves. The bore holes 70 are configured to contain a semi-fixed rod 72. The semi-fixed rod 72 includes a plurality of wide spacing bushings 74 having an axial length of $X_2$ and narrow spacing bushings 76 having an axial length of $X_1$. The wide and narrow spacing bushings 74 and 76 may be formed from a non-conductive material or may include a conductive material to electrically couple each of the inner and outer electrode plates 62 and 64 to one another. The wide and narrow spacing bushings 74 and 76 may also be configured to space the inner and outer electrode plates 62 and 64 axial apart from one another. The semi-fixed rod 72 may include an inner rod extending through the wide and narrow spacing bushings 74 and 76 and the bore holes 70 and may be removably fixed to the outer electrode plates 64. Further, the semi-fixed rod 72 may be configured to be removed from the stationary electrode assembly 60 when the stationary electrode assembly 60 is outside the lower housing 20b.

The inner and outer electrode plates 62 and 64 may also include one or more short radial slots 78 extending from the peripheral edge to a position near the peripheral edge and the opening to the radial slot 66. The short radial slots 78 are configured to receive a removable spacing rod 80 (see FIG. 5). The removable spacing rod 80 may be a unitarily formed rod having small diameter sections 82 each having a diameter that is approximately the same size as the width of the short radial slot and is configured to abut at least an innermost portion of the short radial slots 78. The removable spacing rod 80 may also include large diameter sections with a diameter that is greater than the width of the short radial slots 78. The large diameter sections may include wide portions 84 having an axial length of $X_2$ and narrow portions 86 having an axial length of $X_1$ to space the inner and outer electrode plates the same distance as the spacing from the semi-fixed rod 72. As with the semi-fixed rod 72, the removable spacing rod 80 may be formed from a non-conductive material or may include a conductive material to electrically couple each of the inner and outer electrode plates 62 and 64 to one another. Unlike the semi-fixed rod 72, the removable spacing rod 80 may be configured to be easily removed from the stationary electrode assembly 60 when the stationary electrode assembly 60 is inside the lower housing 20b. The removable spacing rod 80 may include end portions 88 configured to axially clamp the removable spacing rod 80 to the outer electrode plates 64.

Returning to FIG. 4, the outer plate 64 may have a pair of brackets 90 configured to engage and be removably secured to the brackets 48 of the lower housing 20b in an overlapping arrangement. The brackets may be formed from a conductive material to provide an electrical pathway from the inner and outer electrode plates 62 and 64 to the reactor housing 20 or the brackets 90 may formed from a non-conductive material to insulate the inner and outer electrode plates 62 and 64 from the reactor housing 20 if it is desired to have the inner and outer electrode plates 62 and 64 at a different reference voltage than the reactor housing 20.

Figure 6:
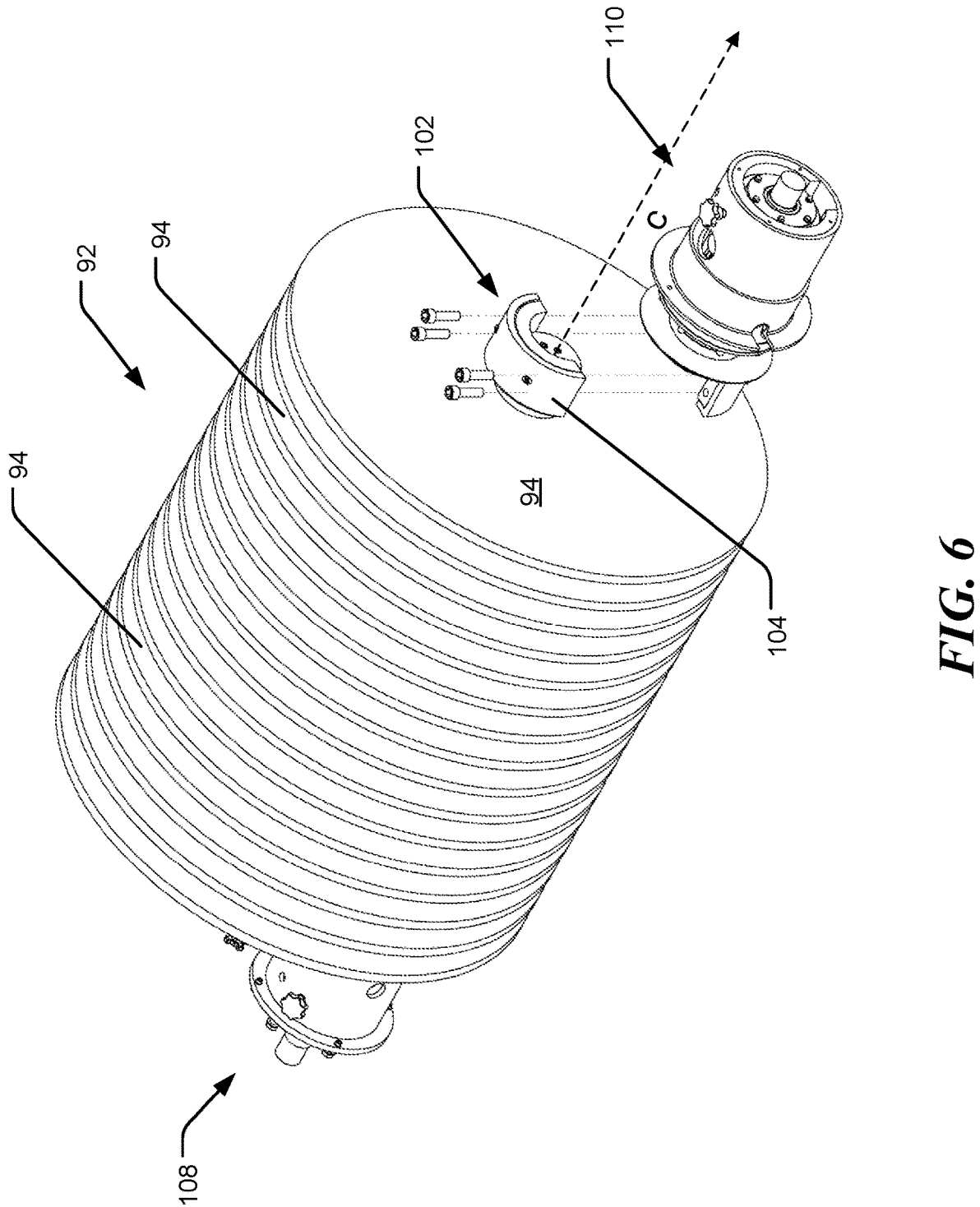
FIG. 6 is a top, front, right-side isometric view of a cassette style electrode assembly of the turboelectric coagulation apparatus from FIG. 1.
Figure 7:
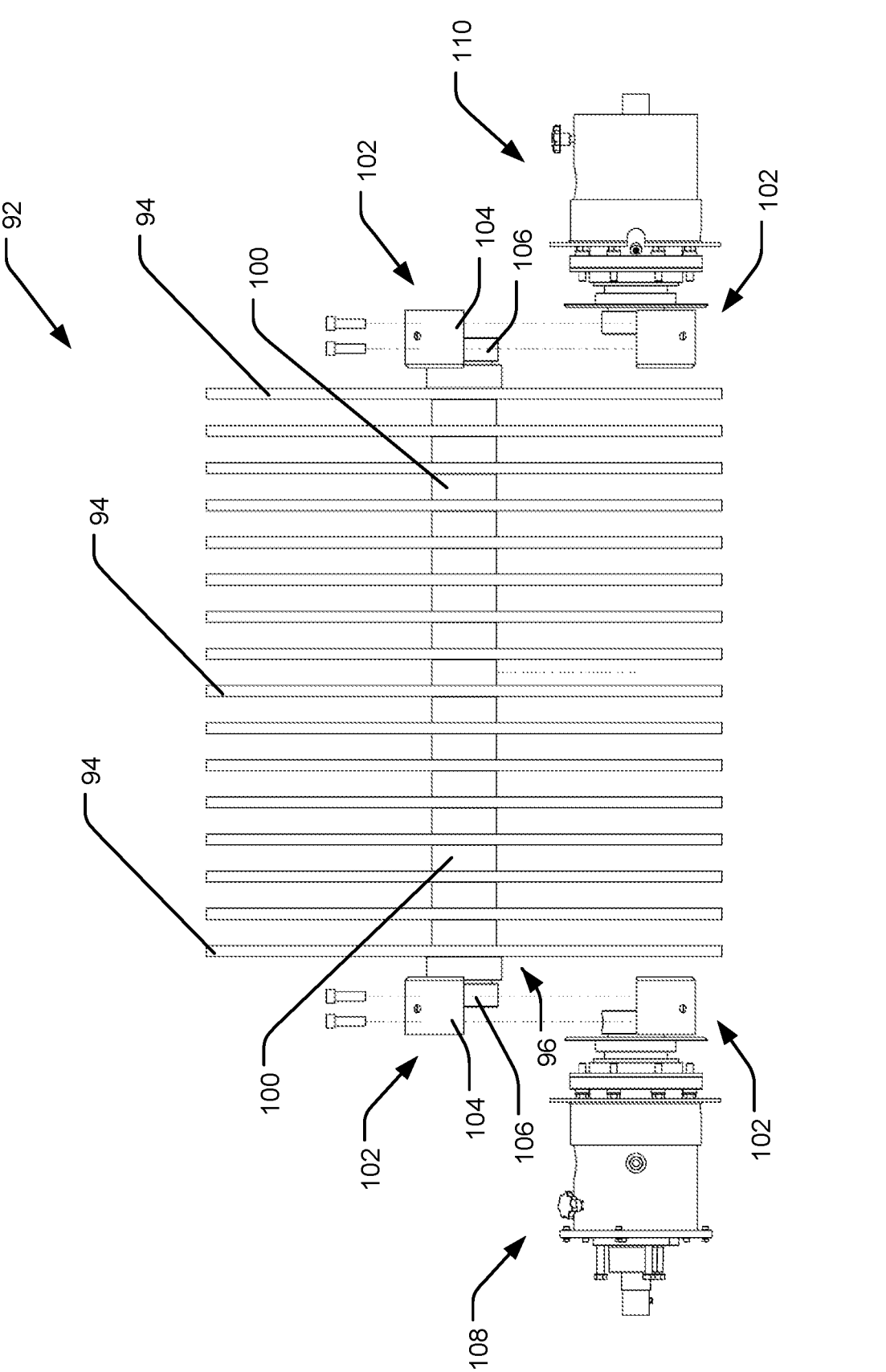
FIG. 7 is a front plan view of the cassette style electrode assembly and motor and free end bearing assemblies of the turboelectric coagulation apparatus from FIG. 1.
Figure 8:
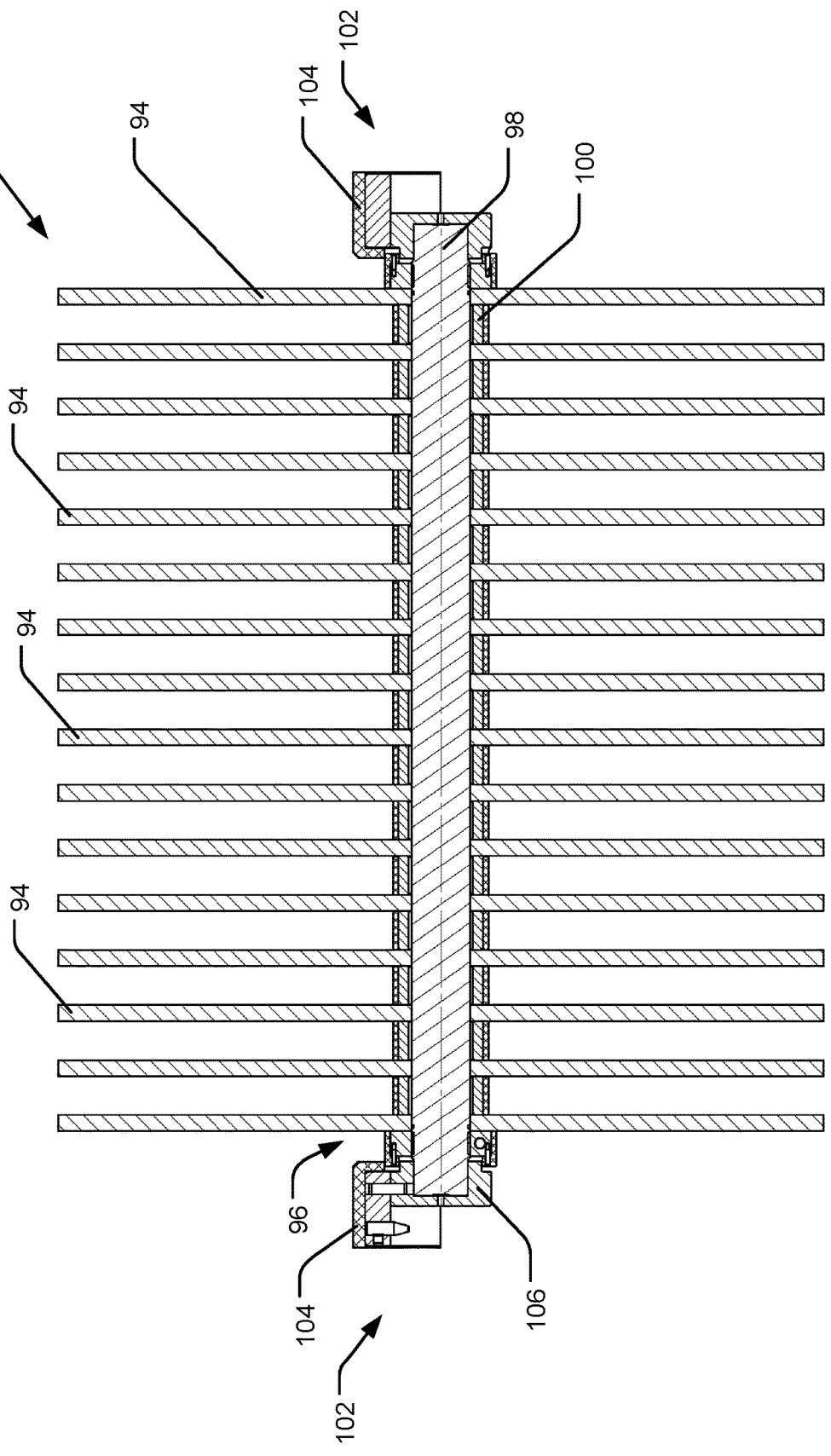
FIG. 8 is a front plan sectional view of the cassette style electrode assembly from FIG. 6.

Turning to FIGS. 6-8, a rotating electrode assembly 92 (also referred to as a cassette-style electrode assembly) is depicted. The cassette-style electrode assembly 92 includes a plurality of disk-shaped electrode plates 94 axially spaced apart from one another and extending radially outward from the drive shaft 96 (see FIG. 7). The drive shaft 96 extends along a longitudinal axis C and includes a conductive inner core 98 in electrical communication with the disk-shaped electrode plates 94. The inner core 98 may be surrounded by a series of non-conductive bushings 100 disposed between each of the disk-shaped electrode plates 94.

The turbocoagulation apparatus 10 may be configured such that the stationary electrode assembly 60 is cathodic and the cassette-style electrode assembly 92 is anodic. For example, the stationary electrode assembly 60 may be comprised of a more noble metal or material than the cassette-style electrode assembly 92. For example, the stationary electrode assembly 60 may be comprised of stainless steel, titanium, platinum, or graphite, whereas the cassette-style electrode assembly 92 may be comprised of aluminum, iron, calcium, or magnesium. In other embodiments, the turbocoagulation apparatus 10 may be configured such that the stationary electrode assembly 60 is anodic and the cassette-style electrode assembly 92 is cathodic. In addition to the dissimilar materials of the electrodes, a power supply 116 (FIG. 10) may apply a DC biasing voltage/current between the cassette-style electrode assembly 92 and the stationary electrode assembly 60.

Figure 9:
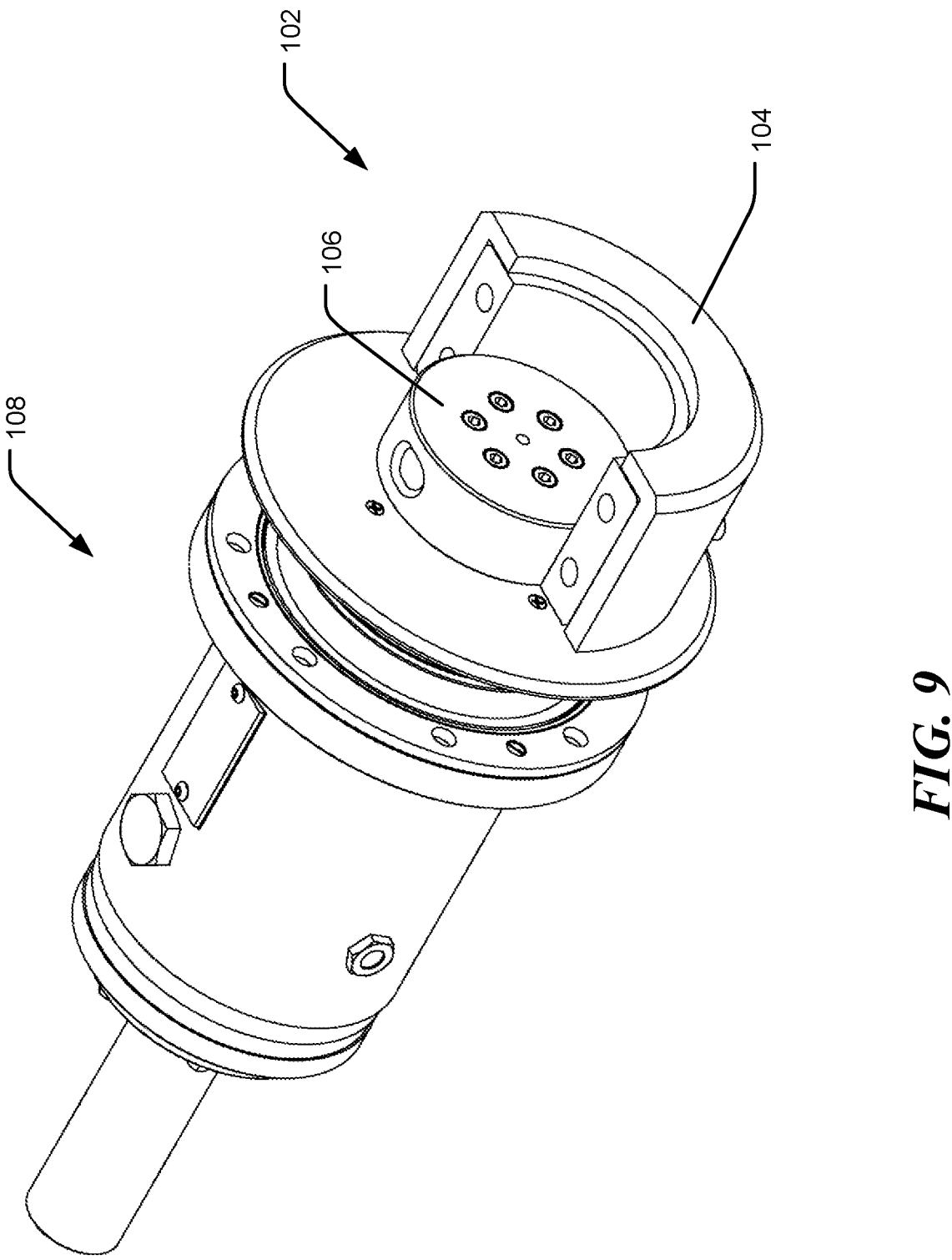
FIG. 9 is a top, front, right-side isometric view of motor end bearing assembly of the turboelectric coagulation apparatus from FIG. 7.

Returning to FIGS. 6-8, each end of the drive shaft 96 extends beyond the disk-shaped electrode plates 94 to a split-shaft coupler 102. The split-shaft coupler 102 includes an outer split-ring collar 104 having a 180-degree cylindrical wall surrounding an inner shaft portion 106, which extends to an axial midpoint of the outer split-ring collar 104. The split-shaft couplers 102 of the cassette-style electrode assembly 92 are configured to attach to a split-shaft coupler 102 of a motor end bearing assembly 108 (see FIG. 9) at one end and a free end bearing assembly 110 at an opposite end. In particular, the inner shaft portions 106 of the cassette-style electrode assembly 92 are configured to axially abut the inner shaft portions 106 of motor and free end bearing assemblies 108 and 110. An exposed outwardly facing cylindrical surface of inner shaft portion 106 is configured to radially contact an inwardly facing cylindrical surface of the outer split-ring collar 104. When these surfaces of the inner shaft portions engage each other as discussed above, planar surfaces of the outer split-ring collar 104 abut one another forming a substantially continuous outer cylindrical surface with the two connected split-ring collars 104. The split-shaft couplers 102 may be removably attached to one another using threaded fasteners such as those depicted in FIGS. 6 and 7.

The external surfaces of the split-shaft coupler 102 may be formed from non-conductive materials and/or the conductive inner core 98 may be electrically insulated from the external surfaces of the split-shaft coupler 102. However, the inner core 98 may be in electrical communication with the inner shaft portion 106 such that an electrical pathway is formed from the cassette-style electrode assembly 92 inside the reactor housing 20 to the motor and free end bearing assemblies 108 and 110 outside the reactor housing 20. Current may be supplied to the end bearing assemblies from the power supply 116 (FIG. 10) using by physical contact using a brush, mercury wetted slip ring, or other rotating connector capable of transmitting current or inductively using transformers (i.e., with direct current rectifying circuitry embedded within the shaft).

FIG. 1 shows the cassette-style electrode assembly 92 together with the stationary electrode assembly 60 in exploded view. Each of the disk-shaped electrode plates 94 (see FIG. 7) are configured to be received in the wide gaps between the inner and outer electrode plates 62 and 64 (see FIG. 5) when the longitudinal axis C of the cassette-style electrode assembly 92 is coaxial with the longitudinal axis B of the stationary electrode assembly 60. In such configuration, the outer surfaces of the disk-shaped electrode plates 94 are equally spaced apart from and face an outer surface of the inner and outer electrode plates 62 and 64, forming a volume therebetween. Fluid in the volume between the electrodes may be expelled radially outward outside of the defined volume due to forces generated by rotation of the disk-shaped electrode plates 94 with respect to the inner and outer electrode plates 62 and 64. Some of the expelled fluid may flow along the cylindrical outer wall 24 (see FIG. 2) of the reactor housing 20 toward an outlet, such as one of openings 36, whereas some of the expelled fluid may be pulled into the narrow spacings between pairs of inner electrode plates 62 that face each other and do not face the disk-shaped electrode plates 94. Fluid drawn into the narrow spacings may then flow into the volume between disk-shaped electrode plates and the inner and outer electrode plates to replace the expelled fluid. While the fluid is inside the volume between the electrodes, the fluid may be exposed to the electric field from the respective surfaces and current may flow therebetween, and electrocoagulation of contaminants in the fluid may occur.

Figure 10:
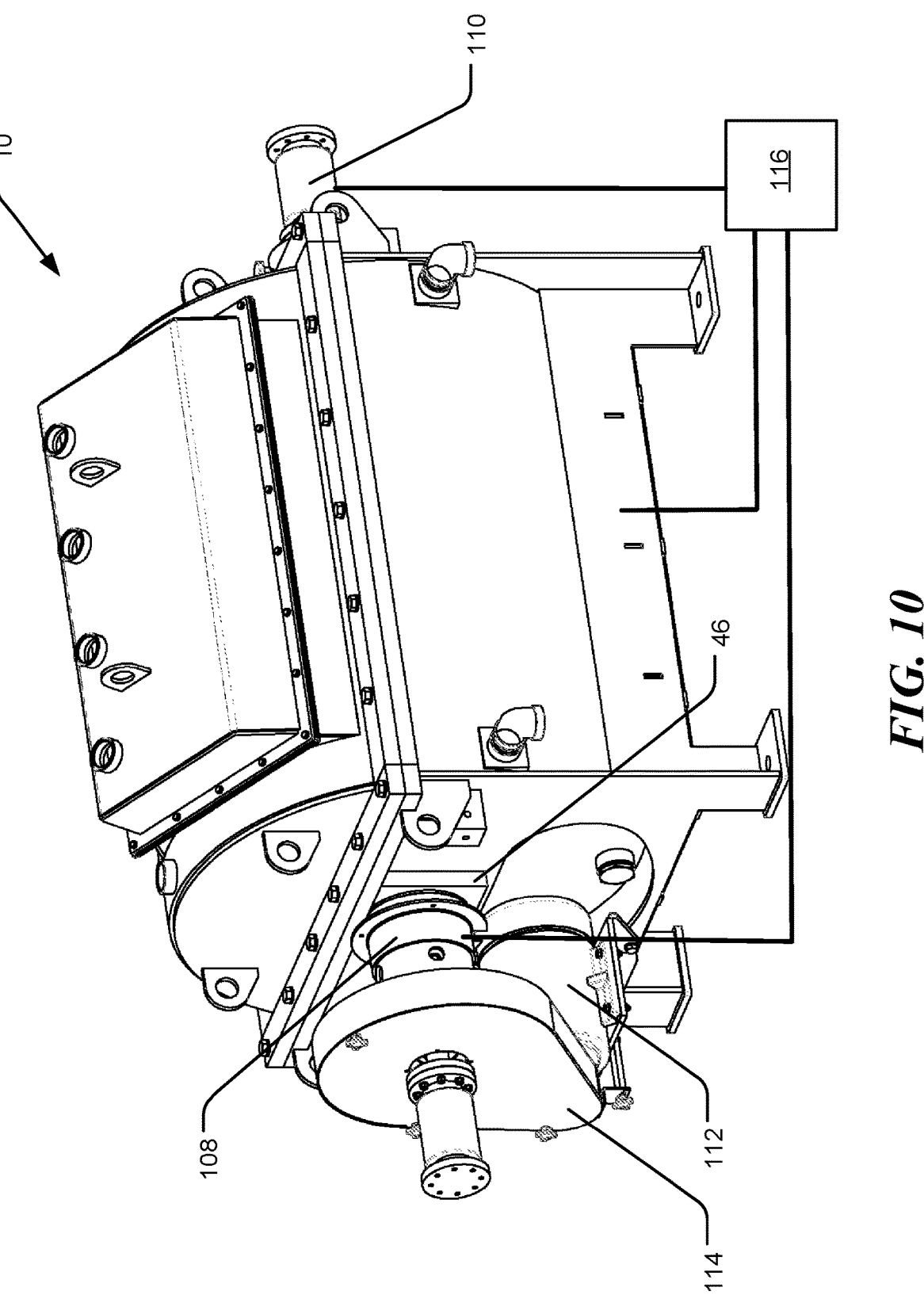
FIG. 10 is a top, front, left-side isometric view of the turboelectric coagulation apparatus from FIG. 1.

FIG. 10 shows an isometric view of the turbocoagulation apparatus 10, in which the motor assembly 112 is connected to the motor end bearing assembly 108 via a drive belt assembly 114. The drive belt assembly 114 includes a cover enclosing a drive belt (not shown). For example, the motor is configured to drive the drive belt which then rotates the drive shaft 96. The motor and free end bearing assemblies 108 and 110 may be mounted to the attachment blocks 46 such that the split-shaft coupler 102 extends through the circular shaft openings 44*a* and 44*b* and into the lower housing 20*b*. The power supply 116 of the turbocoagulation apparatus 10 is configured to supply current to one or both of the motor and free end bearing assemblies 108 and 110 and a return path from through the reactor housing to the power supply 116 or a common ground between the two.

In the description that follows, the assembly/disassembly of the turbocoagulation apparatus 10 will be described. The disk-shaped electrode plates 94 of the cassette-style electrode assembly 92 may gradually corrode or dissolve as a result of the electrocoagulation process. Consequently, the disk-shaped electrode plates 94 may require periodic replacement to ensure efficient operation of the turbocoagulation apparatus 10.

To facilitate removal and replacement of the cassette-style electrode assembly 92, external power to the motor and to the electrodes may be turned off. Next, the fluid in the reactor housing 20 may be drained. In some embodiments, it may be necessary to completely drain the fluid through, for example, the opening 38 at the bottom of the lower housing 20*b*. In other embodiments, it may be necessary to drain the fluid from at least the upper housing 20*a* and below the mounting bracket 48 through, for example, the opening 38 in the lower housing 20*b*. After the fluid has been drained at least from the upper housing 20*a*, the upper housing 20*a* may be separated and removed from the lower housing 20*b*. The drive shaft 96 may then be rotated to an angular position such that the split-ring collars 104 of the split-shaft coupler 102 faces upward (this angular position is shown in FIGS. 6-8).

Figure 5:
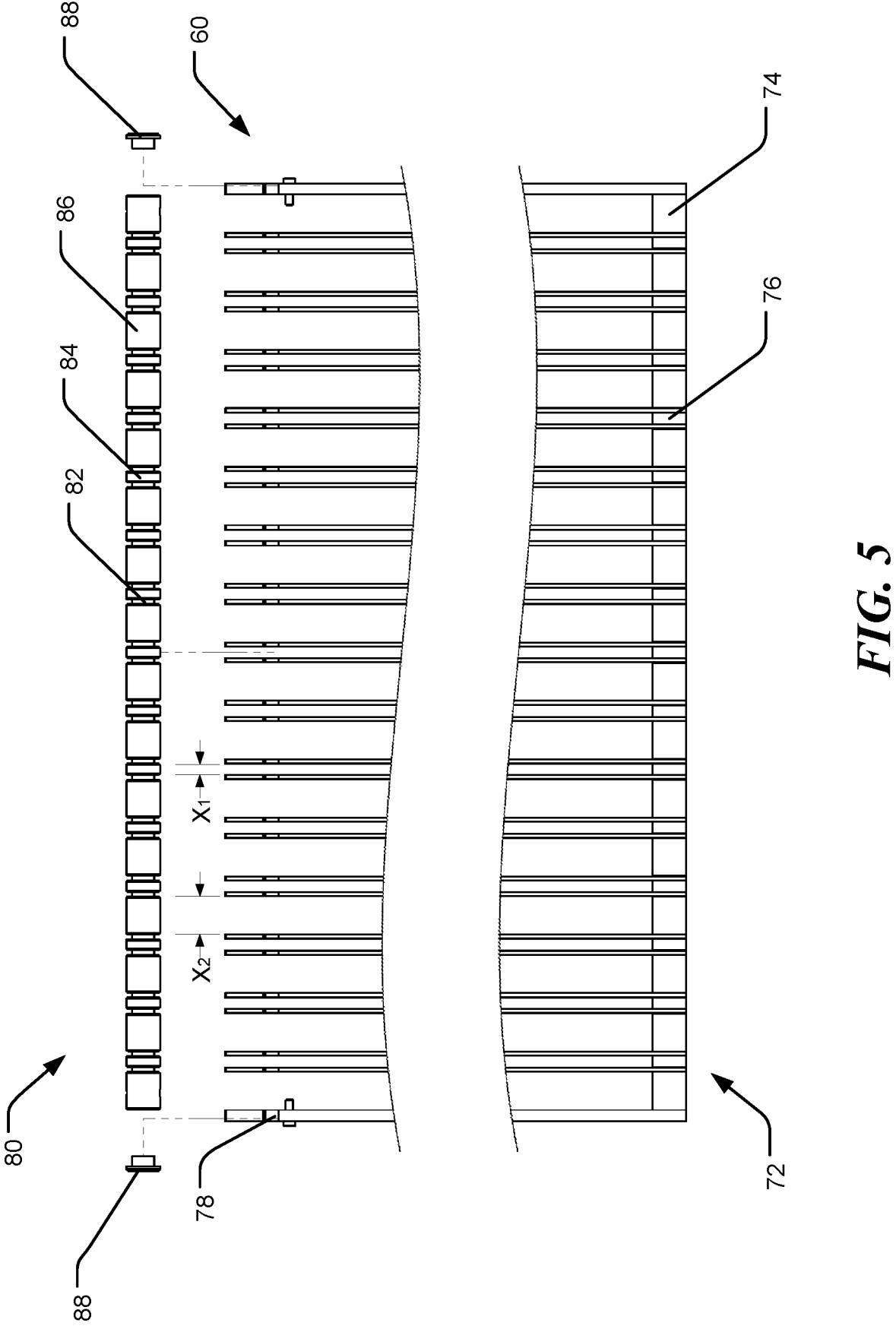
FIG. 5 is a partially exploded front plan view of the stationary electrode assembly FIG. 4 shown with broken lines.

Next, turning to FIG. 5, the end portions 88 of the removable spacing rod 80 may be axially removed therefrom and the removable spacing rod may then be radially moved upward and away from the inner and outer electrode plates 62 and 64. After the removable spacing rod 80 has been removed from the stationary electrode assembly 60, fasteners attaching the split-shaft couplers 102 of the cassette electrode assembly 92 to the split-shaft couplers 102 of the motor and free end bearing assemblies 108 and 110 may be removed. Next the cassette-style electrode assembly 92 may be removed by moving the drive shaft 96 upward through and out of the radial slot 66 in the stationary electrode assembly. A replacement cassette-style electrode assembly 92 may be reinstalled in substantially the reverse order discussed above. If it is desired for the stationary electrode assembly 60 to be removed, it may done so at this time by removing the brackets 90 from the mounting brackets 48 of the lower housing 20*b*.

In addition to providing easy access to remove the cassette electrode assembly 92, the split-shaft couplers 102 also allow easy access to remove the motor and free end bearing assemblies 108 and 110 without having to remove the cassette electrode assembly 92 from the reactor housing 20.

The foregoing description of the various embodiments has been presented for purposes of illustration and description and is not intended to be exhaustive or to limit the disclosure to the precise form disclosed, and obviously many modifications and variations are possible in light of the above teaching. The embodiments were chosen and described in order to best explain the principles of the various embodiments and its practical application to thereby enable others skilled in the art to best utilize the various embodiments and with various modifications as are suited to the particular use contemplated. It is intended that the scope of the disclosure be defined by the claims appended hereto.

I claim:

1. An apparatus for removing contaminants from fluid, the apparatus comprising:
   a housing having a first wall and defining an inner volume;
   a rotating electrode assembly including:
      an inner shaft rotatably mounted within the housing;
      a first rotatable planar electrode extending radially outward from the inner shaft;
      a second rotatable planar electrode offset from the first rotatable planar electrode and extending radially outward from the inner shaft, the conductive core extending through the inner shaft and electrically connecting the first rotatable planar electrode and the second rotatable planar electrode; and
      a non-conductive bushing disposed between the first rotatable planar electrode and the second rotatable planar electrode and extending around the conductive core;
   a first planar stationary electrode having a first opening, the first opening shaped to permit the inner shaft to pass through the first opening, the first planar stationary electrode extending parallel to and between the first rotatable planar electrode and the second rotatable planar electrode;
   a motor assembly including a motor, a motor bearing extending through the first wall, and a first outer shaft coupled to the inner shaft, wherein the inner shaft is mechanically and electrically coupled to the motor bearing within the inner volume by a split-shaft coupler of the motor bearing disposed within the inner volume of the housing such that the first outer shaft and the inner shaft are coaxial with the motor bearing, wherein the motor is configured to rotate the inner shaft such that, when fluid is contained within the housing and the motor rotates the inner shaft, the fluid is caused to pass through a first volume between the inner shaft and the first planar stationary electrode and to flow radially outward between the first planar stationary electrode and the first rotatable planar electrode; and
   a sand trap mounted on an upper portion of the housing, wherein the upper portion of the housing comprises a plurality of ducts providing a fluidic pathway between the sand trap and an internal volume of the housing, the sand trap containing sand to filter abrasives from the fluid contained within the housing via a flow of the fluid from the internal volume of the housing to the sand trap through the plurality of ducts, wherein the split-shaft coupler comprises an inner conductive portion and an outer non-conductive portion, the inner conductive portion providing an electrical communication between the first outer shaft and the conductive core of the inner shaft and a mechanical communication between the first outer shaft and the inner shaft when the inner shaft is coupled to the first outer shaft and the outer non-conductive portion electrically isolating the inner shaft from the fluid contained with the housing; and wherein the split-shaft coupler provides removal of the rotating electrode assembly from the housing when the inner shaft is decoupled from the first outer shaft.

2. The apparatus of claim 1, wherein the rotating electrode assembly further includes a first half of the split-shaft coupler coupled to the inner shaft and a second half of the split-shaft coupler is coupled to the first outer shaft.

3. The apparatus of claim 1, wherein the split-shaft coupler forms a portion of an electrical pathway for facilitating electrical communication between the first outer shaft and the conductive core.

4. The apparatus of claim 1, wherein the split-shaft coupler is a first split-shaft coupler disposed at a first end of the inner shaft, the apparatus further comprising a second split-shaft coupler disposed at a second end of the inner shaft opposite the first end of the inner shaft, wherein each of the first split-shaft coupler and the second split-shaft coupler forms a respective portion of an electrical pathway for transmitting current through the rotating electrode assembly.

5. A rotating electrode assembly comprising:

a shaft having an electrically conductive inner core;

a first shaft coupler comprising an inner conductive portion and an outer non-conductive portion, the first shaft coupler positioned at an axial end of the shaft, wherein the first shaft coupler is configured to be removably mechanically and wherein the inner conductive portion is electrically coupled to a drive shaft coupler of a drive shaft extending through a sidewall of a housing of an electrocoagulation apparatus, and wherein, when the first shaft coupler is mechanically coupled to the drive shaft coupler, an electrical communication between the drive shaft and the conductive inner core of the shaft is provided via the inner conductive portion and the shaft is axially aligned with the drive shaft and wherein the rotating electrode assembly is removable from the housing when the first shaft coupler is mechanically decoupled from the drive shaft coupler;

a drive shaft bearing, wherein the axial end of the shaft is mechanically and electrically coupled to the drive shaft bearing within the housing such that the shaft is coaxial with the drive shaft bearing;

a first rotatable planar electrode extending radially outward from the shaft and in electrical communication with the electrically conductive inner core;

a second rotatable planar electrode extending radially outward from the shaft and in electrical communication with the electrically conductive inner core;

a non-conductive bushing disposed between the first rotatable planar electrode and the second rotatable planar electrode and extending around an exterior surface of the electrically conductive inner core; and a sand trap mounted on an upper portion of a housing, wherein the upper portion of the housing comprises a plurality of ducts providing a fluidic pathway between the sand trap and an internal volume of the housing, the sand trap containing sand to filter abrasives from a fluid contained within the housing via a flow of the fluid from the internal volume of the housing to the sand trap through the plurality of ducts, wherein the first rotatable planar electrode and the second rotatable planar electrode are configured to cause electrocoagulation of contaminants in fluid between a stationary electrode in the housing and the first rotatable planar electrode and the second rotatable planar electrode when the first shaft coupler is mechanically and electrically coupled to a second shaft coupler and when current is passed through the first rotatable planar electrode and the second rotatable planar electrode.

6. The rotating electrode assembly of claim 5, wherein the non-conductive bushing is one of a plurality of non-conductive bushings distributed along a length of the electrically conductive inner core.

7. The rotating electrode assembly of claim 5, wherein the axial end is a first axial end of the shaft, and wherein the shaft further includes a second shaft coupler at a second axial end of the shaft opposite the first axial end.

8. The rotating electrode assembly of claim 5, wherein the axial end is a first axial end of the shaft, and wherein the shaft further includes a second shaft coupler at a second axial end of the shaft opposite the first axial end, and wherein the second shaft coupler is configured to be removably mechanically and electrically coupled to a bearing shaft coupler of a bearing shaft within the housing.

9. The rotating electrode assembly of claim 5, wherein the first shaft coupler is a split-shaft coupler.

10. An apparatus for removing contaminants from fluids, the apparatus comprising:

a housing defining an inner volume;

a rotating electrode assembly rotatably mounted entirely within the inner volume, the rotating electrode assembly including a shaft including:

a conductive inner core;

a plurality of rotatable planar electrodes extending radially outward from the shaft and in electrical communication with the conductive inner core; and a non-conductive bushing extending around the conductive inner core and disposed between an adjacent pair of the plurality of rotatable planar electrodes;

a stationary electrode mounted within the housing and extending parallel to and between the adjacent pair of the plurality of rotatable planar electrodes;

a motor bearing extending through the first wall, wherein a first axial end of the shaft is mechanically and electrically coupled to the motor bearing within the inner volume by a split-shaft coupler of the motor bearing disposed within the inner volume of the housing such that the shaft is coaxial with the motor bearing; and a sand trap mounted on an upper portion of the housing, wherein the upper portion of the housing comprises a plurality of ducts providing a fluidic pathway between the sand trap and an internal volume of the housing, the sand trap containing sand to filter abrasives from a fluid contained within the housing via a flow of the fluid from the internal volume of the housing to the sand trap through the plurality of ducts, wherein the split-shaft coupler comprises an inner conductive portion and an outer non-conductive portion, the inner conductive portion providing an electrical communication between the first outer shaft and the conductive core of the inner shaft and a mechanical communication between the first outer shaft and the inner shaft when the inner shaft is coupled to the first outer shaft and the outer non-conductive portion electrically isolating the inner shaft from the fluid contained with the housing; and wherein the split-shaft coupler provides removal of the rotating electrode assembly from the housing when the inner shaft is decoupled from the first outer shaft.

11. The apparatus of claim 10, wherein the rotating electrode assembly further includes the split-shaft coupler coupled to the shaft and the motor bearing includes a second split-shaft coupler coupled to the split-shaft coupler.

12. The apparatus of claim 10 further comprising a free end bearing disposed opposite the motor bearing, wherein a second axial end of the shaft opposite the first axial end is mechanically and electrically coupled to the free end bearing within the inner volume such that the shaft is also coaxial with the free end bearing.

13. The apparatus of claim 10 further comprising a motor coupled to the motor bearing, wherein, when the motor is actuated, the rotating electrode assembly rotates within the housing.

14. The apparatus of claim 1 further comprising a power supply configured to apply a DC biasing voltage between the rotating electrode assembly and the first planar stationary electrode.

15. The apparatus of claim 10 further comprising a power supply configured to apply a DC biasing voltage between the rotating electrode assembly and the stationary electrode.

\*  \*  \*  \*  \*